H. A. Norris.
Tapping Mains.
Nº 2,794.   Patented Sept. 30, 1842.
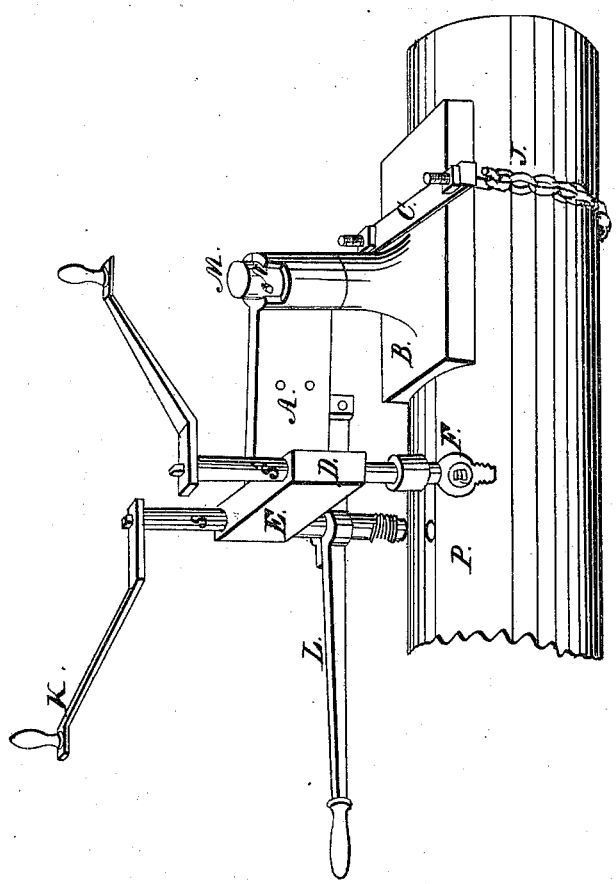

UNITED STATES PATENT OFFICE.

H. ARIEL NORRIS, OF NEW YORK, N. Y.

MACHINE FOR BORING, TAPPING, AND REAMING WATER-PIPES UNDER HYDROSTATIC PRESSURE.

Specification forming part of Letters Patent No. 2,794, dated September 30, 1842; Reissued September 9, 1843, No. 53.

*To all whom it may concern:*

Be it known that I, H. ARIEL NORRIS, of the city, county, and State of New York, have invented a new and useful machine for boring, tapping, and reaming water or other pipes under hydrostatic pressure and for making thereto connections of lateral or service pipes; and I hereby declare the following to be a full and accurate description thereof, reference being had to the annexed drawings, making part of this specification and representing in perspective the machine attached to a pipe ready for operation.

To bore the pipe P, the base B of the machine is laid upon the pipe and strongly pressed upon it by the chain or band J passing around the pipe, and drawn tight by screws working through the cross-bar C. A mandrel M attached to the base B, supports a swinging frame A E, in a collar of which the drill S works, and to another part D of the frame the ferulet F (or connecting tube to which the lateral pipe is to be attached) is fixed ready for insertion. A downward pressure is given to the drill by the lever L, working against a shoulder upon its shaft. By turning the crank K the hole is bored, when the escape of water will be but slight, for before the thickness of the metal is drilled, the reamer or tap as the case may be, will have entered the orifice thereby nearly closing it. The opening being thus drilled and tapped or reamed is now ready for the insertion of the ferulet. Raising the lever, and with it the drill and shaft, the movable part of the machine is rapidly swung so as to bring the ferulet immediately over the opening, into which it may be at once screwed by turning the shaft S' working in the frame AE, or, if it is preferred to drive it instead of screwing it, this may be done either by driving the shaft S' or by a lever working similarly to the lever L. Thus the water is allowed to escape for only the short time requisite to raise the lever L and carry it over a short space. A pin N is fixed in the mandrel so as to arrest the motion of the frame when the ferulet is accurately over the orifice.

The principal effect of this machine could be produced by letting the end E of the frame slide lengthwise in guides attached to the base B, instead of revolving upon the mandrel as described. Or the drill and ferulet may move each upon a separate frame instead of being connected by the same one, and, though less convenient, would have a similar effect. Or the drill may work in a moving frame and the ferulet shaft in a stationary one directly above it; the drill being removed upon the completion of the orifice, the ferulet-shaft may be made to slide rapidly down to the orifice and the ferulet thus inserted. In all these arrangements the object desired is to remove the drill from the orifice and bring the ferulet instantly into its place; thus avoiding the inconveniences that would result from a flow of water in the interim, were the operation less promptly performed.

I claim as my invention and desire to secure by Letters Patent—

1. The connection of the ferulet and drill-shaft with each other by means of a sliding or swinging frame upon which both of them work according to the principles herein set forth, and by which either is removed and the other instantly brought into its place, thus avoiding the necessity of a valve to prevent the flow of water in the interim.

2. I also claim the ferulet shaft (or any analogous device substantially as herein described for holding the ferulet for insertion) working in a sliding or swinging frame as herein described, in combination with the drill whether working in the same frame or not.

3. And I further claim the drill working in a sliding or swinging frame as herein described, in combination with the ferulet shaft whether working in the same frame or not.

H. ARIEL NORRIS.

Witnesses:
  THO. H. NORRIS,
  I. LIBAGH.

[FIRST PRINTED 1913.]